US011080280B2

(12) United States Patent
Bodziony et al.

(10) Patent No.: US 11,080,280 B2
(45) Date of Patent: Aug. 3, 2021

(54) ENABLE MERGE JOIN ON ENCRYPTED DATA

(71) Applicant: INTERNATIONAL BUSINESS MACHINES CORPORATION, Armonk, NY (US)

(72) Inventors: Michal Bodziony, Tegoborze (PL); Marcin Luczynski, Cracow (PL); Tomasz Zatorski, Cracow (PL); Andrzej Laskawiec, Cracow (PL); Lukasz S. Studzienny, Cracow (PL); Marcin Filip, Cracow (PL); Monika Piatek, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 16/178,765

(22) Filed: Nov. 2, 2018

(65) Prior Publication Data
US 2020/0142993 A1  May 7, 2020

(51) Int. Cl.
*G06F 7/00* (2006.01)
*G06F 16/2455* (2019.01)
(Continued)

(52) U.S. Cl.
CPC ...... *G06F 16/2456* (2019.01); *G06F 16/2282* (2019.01); *G06F 16/2453* (2019.01); *G06F 21/6227* (2013.01); *H04L 9/008* (2013.01)

(58) Field of Classification Search
CPC ............. G06F 16/2456; G06F 16/2453; G06F 16/2282; G06F 21/6254; G06F 21/6227; G06F 21/602

(Continued)

(56) References Cited

U.S. PATENT DOCUMENTS

2015/0039912 A1* 2/2015 Payton .................... H04L 9/008
713/193
2017/0235969 A1 8/2017 Kamara
(Continued)

FOREIGN PATENT DOCUMENTS

EP  32443391 A1  11/2017

OTHER PUBLICATIONS

Brakerski, Zvika et al.; Fully Homomorphic Encryption without Bootstrapping; Proceedings of the 3rd Innovations in Theoretical Computer Science Conference; Jan. 8-10, 2012; 26 pages.
(Continued)

*Primary Examiner* — Md I Uddin
(74) *Attorney, Agent, or Firm* — Schmeiser, Olsen & Watts; William H. Hartwell

(57) ABSTRACT

An approach is provided for encrypting data. Using an encryption function, values of keys in a first database table are encrypted. The encryption function is determined to be homomorphic to sorting operators. A decryption function that decrypts the encrypted keys is determined to be homomorphic to sorting operators. Responsive to the encryption and decryption functions being determined to be homomorphic, a merge join operation is selected. The merge join operation operates on the first database table and a second database table and includes the decryption function in a joining condition. Using the merge join operation, an execution of a query is optimized. The query accesses one or more data items in the first or second database table.

16 Claims, 7 Drawing Sheets

(51) Int. Cl.
    *G06F 21/62*     (2013.01)
    *H04L 9/00*      (2006.01)
    *G06F 16/22*     (2019.01)
    *G06F 16/2453*   (2019.01)

(58) Field of Classification Search
    USPC .......... 707/718, 737, 776, 999.002; 713/150, 713/189, 193
    See application file for complete search history.

(56)  References Cited

U.S. PATENT DOCUMENTS

2017/0264430 A1*  9/2017  Robertson ............... H04L 9/083
2017/0373834 A1   12/2017 Mandal
2019/0109701 A1*  4/2019  Paz de Araujo .... H04L 63/0435

OTHER PUBLICATIONS

Gahi, Youssef et al.; A Secure Database System Using Homomorphic Encryption Schemes; DBKDA 2011: The Third International Conference on Advances in Databases, Knowledge, and Data Applications; Jan. 23-28, 2011; submitted to arXiv Dec. 11, 2015; Dec. 11, 2015; https://arxiv.org/abs/1512.03498; 5 pages.

GitHub.com; An Implementation of homomorphic encryption; https://github.com/shaih/HElib#start-of-content; retrieved from the Internet Aug. 28, 2018; 2 pages.

Rohloff, Kurt et al.; A Scalable Implementation of Fully Homomorphic Encryption Built on NTRU; Challenges and Opportunities Associated with a Bitcoin-Based Transaction Rating System; Feb. 16, 2014; 12 pages.

* cited by examiner

| CITIZENS_D | |
|---|---|
| BIRTH_DATE | CITY_ID (FK) |
| 1980-08-12 | 17 |
| 1986-12-15 | 27 |
| 1967-11-06 | 27 |
| 1950-05-21 | 27 |
| 2000-01-10 | 37 |
| 1999-06-30 | 37 |

| CITIZENS | |
|---|---|
| BIRTH_DATE | CITY_ID (FK) |
| 1980-08-12 | (10*64+34) |
| 1986-12-15 | (20*64+3) |
| 1967-11-06 | (20*64+54) |
| 1950-05-21 | (20*64+12) |
| 2000-01-10 | (30*64+40) |
| 1999-06-30 | (30*64+13) |

ENABLE MERGE JOIN ON ENCRYPTED DATA

BACKGROUND

The present invention relates to data security, and more particularly to data anonymization.

There are many situations in which there is a need to obfuscate sensitive data. Usually, it is necessary to hide some aspects of data, but not other aspects. For example, data items consisting of national identifiers (IDs) and user addresses may need to be available to a user, but not the mapping between the data items. Conventional data security techniques encode a primary key, a foreign key, or both the primary key and the foreign key. Before the encryption, the conventional techniques may physically order the data by the primary key and the foreign key.

SUMMARY

In one embodiment, the present invention provides a computer-implemented method of encrypting data. The method includes encrypting, by one or more processors and using an encryption function, values of keys in a database table ordered by the keys in a relational database management system. The keys are primary keys in a first database table or foreign keys in a second database table. The method further includes determining, by the one or more processors, that the encryption function is homomorphic to sorting operators. The method further includes determining, by the one or more processors, that a decryption function that decrypts the encrypted keys in the database table is homomorphic to sorting operators. The method further includes in response to the encryption and decryption functions being determined to be homomorphic, selecting, by the one or more processors, a merge join operation. The merge join operation operates on the first and second database tables and includes the decryption function in a joining condition. The method further includes using the selected merge join operation, optimizing, by the one or more processors, an execution of a query that accesses one or more data items in the first or second database table.

In another embodiment, the present invention provides a computer program product for encrypting data. The computer program product includes a computer readable storage medium. Computer readable program code is stored in the computer readable storage medium. The computer readable storage medium is not a transitory signal per se. The computer readable program code is executed by a central processing unit (CPU) of a computer system to cause the computer system to perform a method. The method includes using an encryption function, the computer system encrypting values of keys in a database table ordered by the keys in a relational database management system. The keys are primary keys in a first database table or foreign keys in a second database table. The method further includes the computer system determining that the encryption function is homomorphic to sorting operators. The method further includes the computer system determining that a decryption function that decrypts the encrypted keys in the database table is homomorphic to sorting operators. The method further includes in response to the encryption and decryption functions being determined to be homomorphic, the computer system selecting a merge join operation. The merge join operation operates on the first and second database tables and includes the decryption function in a joining condition. The method further includes using the selected merge join operation, the computer system optimizing an execution of a query that accesses one or more data items in the first or second database table.

In another embodiment, the present invention provides a computer system including a central processing unit (CPU); a memory coupled to the CPU; and a computer readable storage medium coupled to the CPU. The computer readable storage medium contains instructions that are executed by the CPU via the memory to implement a method of encrypting data. The method includes using an encryption function, the computer system encrypting values of keys in a database table ordered by the keys in a relational database management system. The keys are primary keys in a first database table or foreign keys in a second database table. The method further includes the computer system determining that the encryption function is homomorphic to sorting operators. The method further includes the computer system determining that a decryption function that decrypts the encrypted keys in the database table is homomorphic to sorting operators. The method further includes in response to the encryption and decryption functions being determined to be homomorphic, the computer system selecting a merge join operation that operates on the first and second database tables and that includes the decryption function in a joining condition. The method further includes using the selected merge join operation, the computer system optimizing an execution of a query that accesses one or more data items in the first or second database table.

BRIEF DESCRIPTION OF THE DRAWINGS

FIG. 5C is an example of a database table resulting from encrypting values of keys in the citizens database table in FIG. 5A, in accordance with embodiments of the present invention.

FIG. 5D is an example of a database table resulting from the citizens database table in FIG. 5A being noised and encoded in the process of FIG. 3, in accordance with embodiments of the present invention.

DETAILED DESCRIPTION

Overview

A conventional data security technique that physically orders data in two tables by primary key and foreign key and subsequently encodes the primary key or the foreign key column, typically does not change the physical order of the data because the encoding function is not homomorphic. In this case, the SQL engine is no longer able to perform a merge join, which causes a negative performance impact on the data in the two tables.

Embodiments of the present invention address the unique performance impact challenges of the conventional data security techniques by using an encryption algorithm that is homomorphic to sorting (i.e., compare) operators. Making the database engine aware that the encryption is homomorphic allows an optimizer to choose merge join for queries that have a decryption function in the joining condition. For example, by using the novel techniques disclosed herein, the following query can be joined by a merge join algorithm (i.e., merge join operator):

SELECT* FROM table1 t1 join table2 t2 on decryptF1 (t1.id,secret1)=decryptF2(t2.id,secret2), where decryptF1( ) and decryptF2( ) are user defined functions (UDFs) which decrypt the values of respective keys.

For database tables in a one-to-one relationship and which have encrypted pairs of foreign keys and primary keys, an attacker can reverse engineer the relation defined by the encrypted pair. In one or more embodiments, a noising system hinders or prevents such an attacker from reverse engineering the relation by (i) adding noise to values of the keys or (ii) noising a database table that has an encrypted key by adding extra duplicates of records which have fake keys.

System for Encrypting Data for Merge Join Enablement

Figure 1:
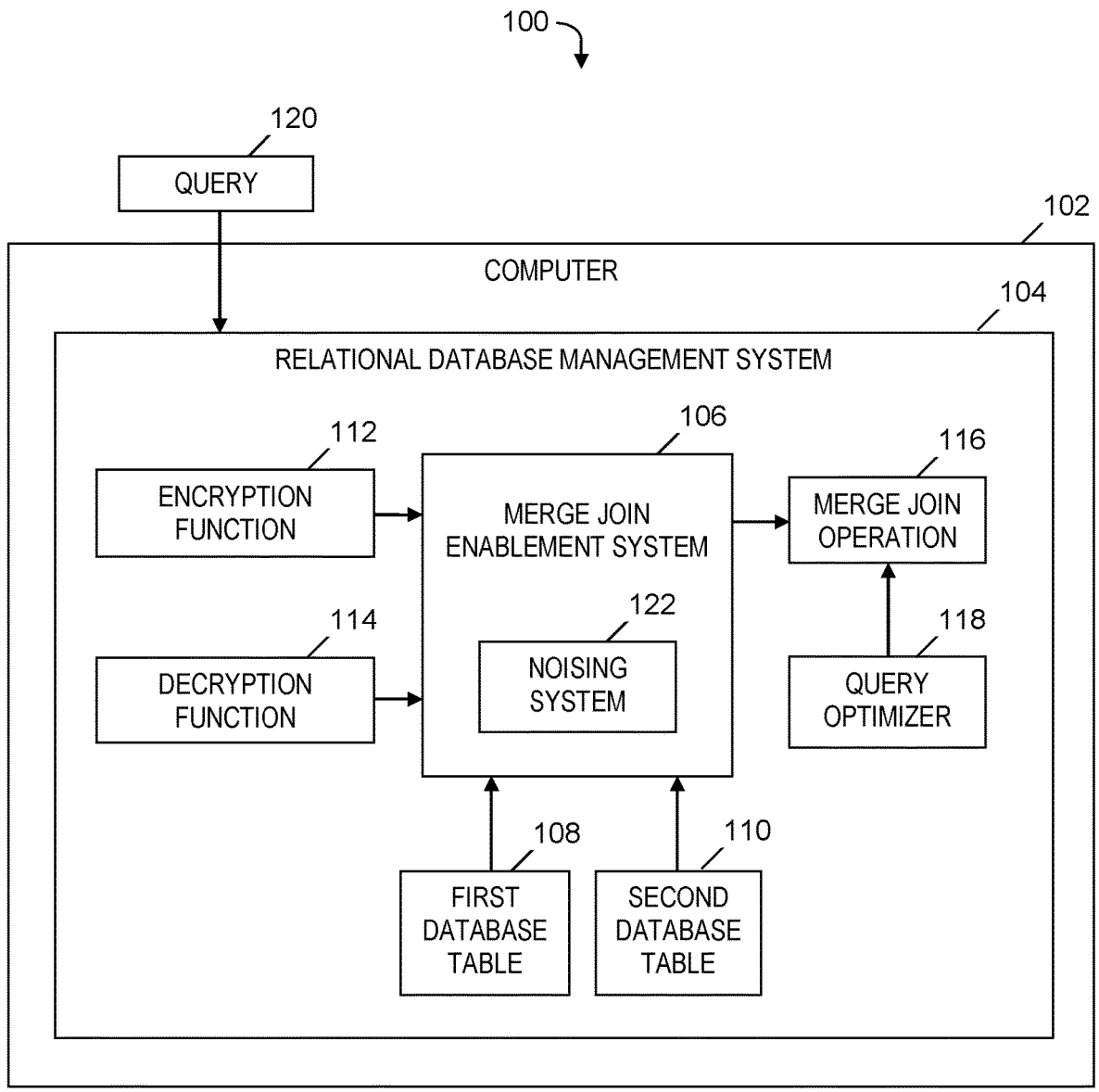
FIG. 1 is a block diagram of a system for encrypting data for merge join enablement, in accordance with embodiments of the present invention.

FIG. 1 is a block diagram of a system 100 for encrypting data for merge join enablement, in accordance with embodiments of the present invention. System 100 includes a computer 102 which executes a relational database management system (RDBMS) 104, which includes a software-based merge join enablement system 106. RDBMS 104 includes database tables, including a first database table 108 and a second database table 110. Merge join enablement system 106 accesses first database table 108 and second database table 110 to encrypt values of keys in first database table 108 and/or second database table 110. Merge join enablement system 106 uses an encryption function 112 to encrypt the values of the keys. A decryption function 114 decrypts the values of the keys that are encrypted by encryption function 112. Merge join enablement system 106 determines that encryption function 112 and decryption function 114 are homomorphic to sorting operators.

Merge join enablement system 106 selects a merge join operation 116 that operates on first database table 108 and second database table 110. Merge join operation 116 includes decryption function 114 in a joining condition. A query optimizer 118 accesses and uses merge join operation 116 to optimize execution of a query 120 of RDBMS 104 that accesses data item(s) in first database table 108 and/or second database table 110.

In one embodiment, merge join enablement system 106 includes noising system 122, which adds noise to values of keys in first database table 108 and/or second database table 110 or which adds noise to a database table by adding extra duplicates of records having fake keys into first database table 108 and/or second database table 110. The addition of noise by noising system 122 prevents an attacker from reverse engineering a relation defined by encrypted value pairs, where each pair includes a primary key value in first database table 108 and a foreign key value in second database table 110. In an alternate embodiment, merge join enablement system 106 does not include noising system 122 and merge join enablement system 106 does not perform the noising of the values of the keys or the noising of the database table.

In one embodiment, RDBMS 104 includes a SQL engine (not shown), which includes merge join enablement system 106, query optimizer 118, and a database that includes first database table 108 and second database table 110.

In one embodiment, merge join enablement system 106 includes query optimizer 118.

The functionality of the components shown in FIG. 1 is described in more detail in the discussion of FIG. 2, FIG. 3, FIG. 4, FIGS. 5A-5D, and FIG. 6 presented below.

Process for Encrypting Data for Merge Join Enablement

Figure 2:
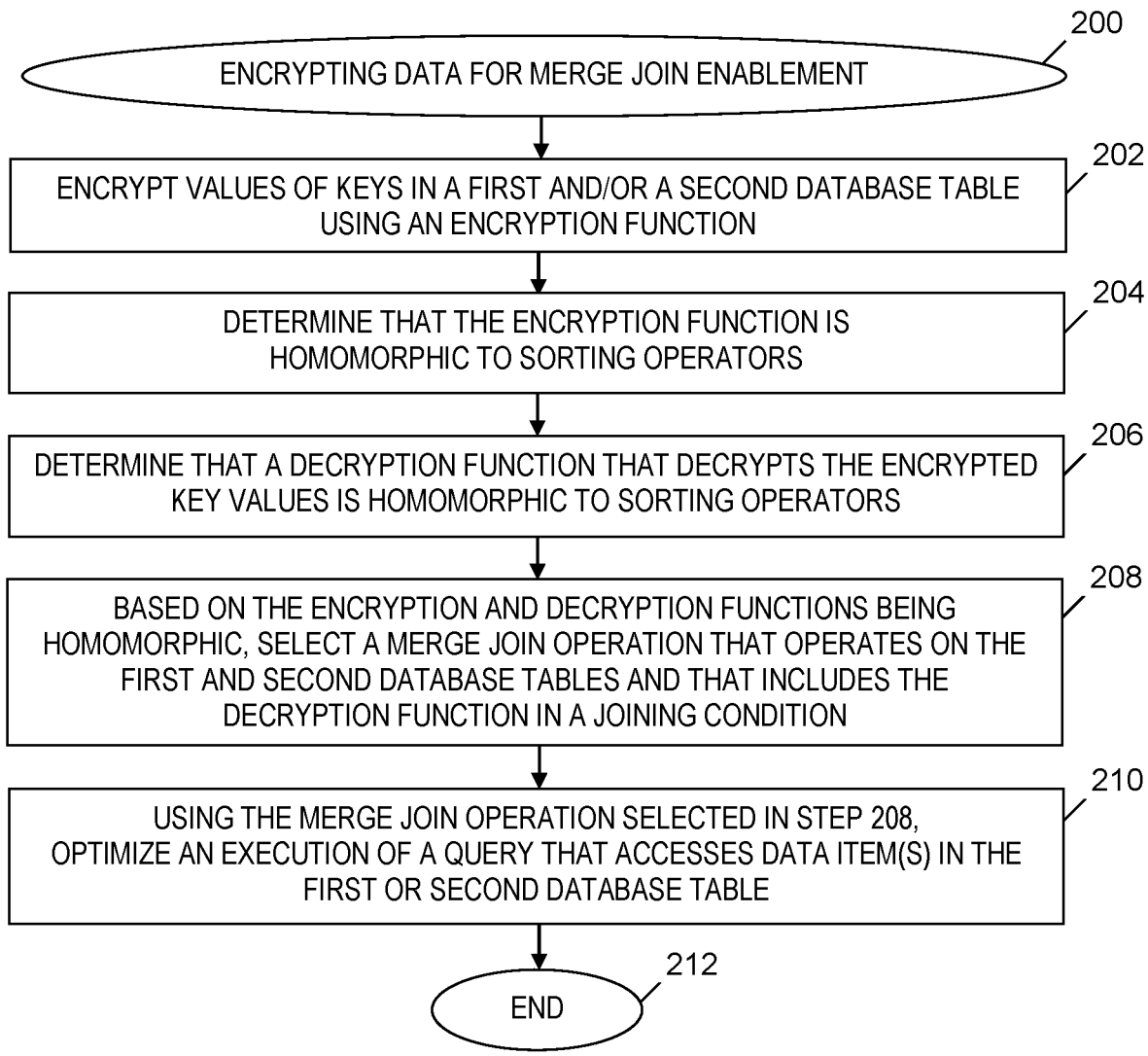
FIG. 2 is a flowchart of a process of encrypting data for merge join enablement, where the process is implemented in the system of FIG. 1, in accordance with embodiments of the present invention.

FIG. 2 is a flowchart of a process of encrypting data for merge join enablement, where the process is implemented in the system of FIG. 1, in accordance with embodiments of the present invention. The process of FIG. 2 starts at step 200. In step 202, merge join enablement system 106 (see FIG. 1) encrypts values of keys in first database table 108 (see FIG. 1) and/or second database table 110 (see FIG. 1).

In step 204, merge join enablement system 106 (see FIG. 1) determines that the encryption function 112 (see FIG. 1) is homomorphic to sorting operations.

In step 206, merge join enablement system 106 (see FIG. 1) determines that decryption function 114 (see FIG. 1) is homomorphic to sorting operations. Decryption function 114 (see FIG. 1) decrypts the values of keys that were encrypted in step 202.

In step 208, based on encryption function 112 (see FIG. 1) and decryption function 114 (see FIG. 1) being homomorphic, merge join enablement system 106 (see FIG. 1) selects merge join operation 116 (see FIG. 1), which operates on data items in first database table 108 (see FIG. 1) and second database table 110 (see FIG. 1). Merge join operation 116 (see FIG. 1) includes decryption function 114 (see FIG. 1) in a joining condition.

In step 210, using merge join operation 116 (see FIG. 1) selected in step 208, query optimizer 118 (see FIG. 1) generates an execution plan for query 120 (see FIG. 1), where the execution plan optimizes an execution of query 120 (see FIG. 1). Query 120 (see FIG. 1) accesses data item(s) in first database table 108 (see FIG. 1) and/or second database table 110 (see FIG. 1).

After step 210, the process of FIG. 2 ends at step 212.

Noising

A challenge resulting from using the homomorphic encryption function 112 (see FIG. 1) in the process of FIG. 2 is an attacker can perform reverse engineering of the relation defined by an encrypted pair of a foreign key and a primary key in first database table 108 (see FIG. 1) and second database table 110 (see FIG. 1), respectively. For example, in a one-to-one master-details relationship between first database table 108 (see FIG. 1) and second database table 110 (see FIG. 1), the aforementioned reverse engineering includes unloading both tables in physical order and join by using ROWID to rejoin the data without the primary key and foreign key. Enhancements to overcome the aforementioned challenge of the attacker being able to perform reverse engineering of the relation are discussed below relative to FIG. 3 and FIG. 4.

Figure 3:
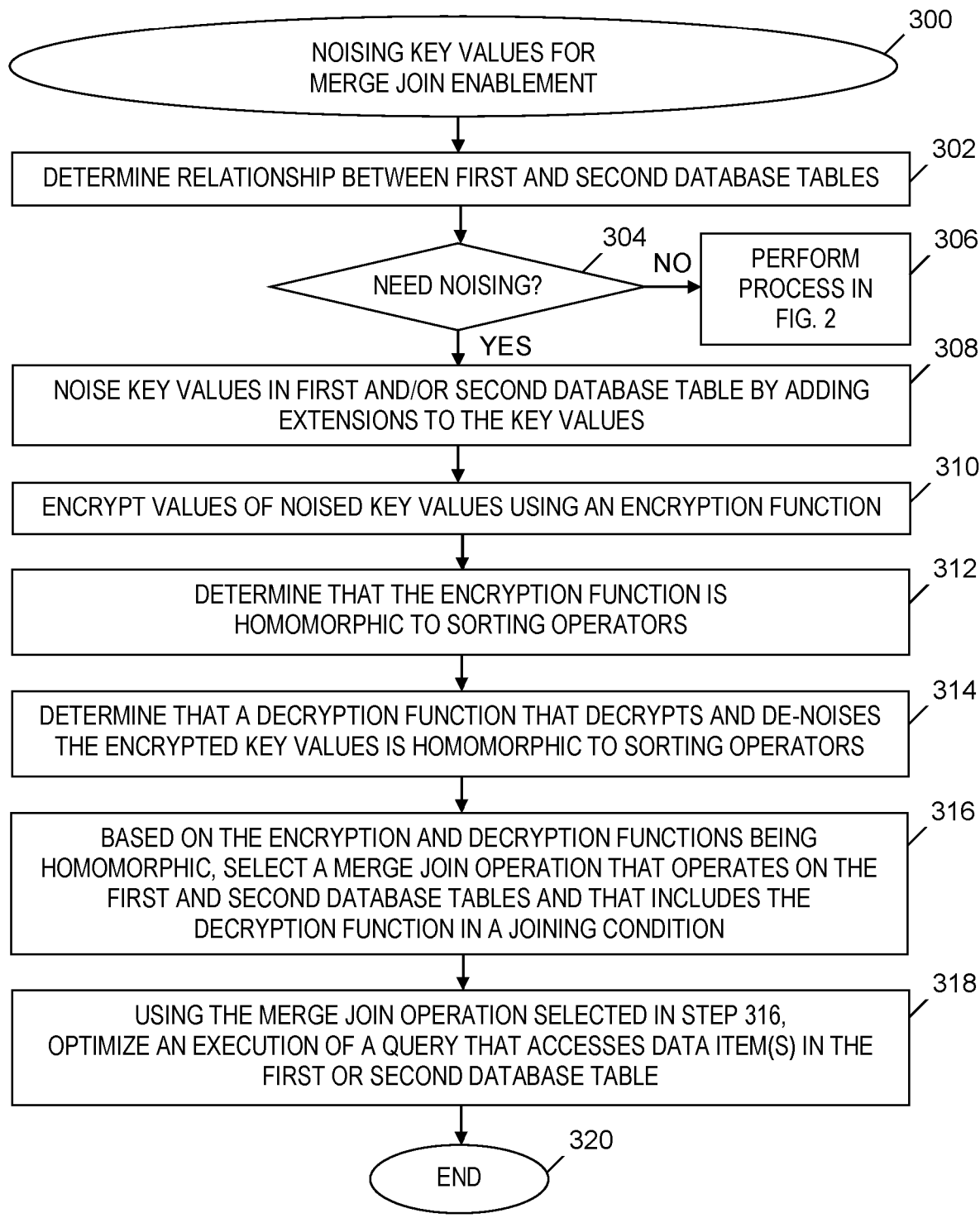
FIG. 3 is a flowchart of a process of noising key values to enhance the process of FIG. 2, in accordance with embodiments of the present invention.

FIG. 3 is a flowchart of a process of noising key values to enhance the process of FIG. 2, in accordance with embodiments of the present invention. The process of FIG. 3 starts at step 300. In step 302, merge join enablement system 106 (see FIG. 1) determines the relationship between first database table 108 (see FIG. 1) and second database table 110 (see FIG. 1), which are accessed by query 120 (see FIG. 1).

In step 304, based on the relationship determined in step 302, merge join enablement system 106 (see FIG. 1) determines whether values of keys in one or both of the database tables (i.e., first and second database tables 108 and 110 in FIG. 1) need noising. Merge join enablement system 106 (see FIG. 1) determining in step 302 that a one-to-one relationship exists between first database table 108 (see FIG. 1) and second database table 110 (see FIG. 1) is a basis for merge join enablement system 106 (see FIG. 1) determining in step 304 that there is a need for noising the values of the keys. If merge join enablement system 106 (see FIG. 1) instead determines that there is not a one-to-one relationship between first database table 108 (see FIG. 1) and second database table 110 (see FIG. 1) (e.g., there is a many-to-many relationship between the database tables), then merge join enablement system 106 (see FIG. 1) determines in step 304 that there is not a need for noising the values of the keys.

If merge join enablement system 106 (see FIG. 1) determines in step 304 that neither the first or second database tables 108 and 110 (see FIG. 1) needs noising, then the No branch of step 304 is followed and step 306 is performed. In step 306, the process of FIG. 2 as discussed above is performed.

Returning to step 304, if merge join enablement system 106 (see FIG. 1) determines that first database table 108 (see FIG. 1) and/or second database table 110 (see FIG. 1) needs noising, then the Yes branch is followed and step 308 is performed.

In step 308, merge join enablement system 106 (see FIG. 1) noises values of keys in first database table 108 (see FIG. 1) and/or second database table 110 (see FIG. 1) by adding extensions to respective values of the keys. For example, for a two-byte value of a key, merge join enablement system 106 (see FIG. 1) can add two random higher bytes to noise the value. The random higher bytes can be provided by a pseudo-random number generator or a hardware random number generator.

In one embodiment, noising system 122 (see FIG. 1) performs steps 302, 304, and 308.

In step 310, using encryption function 112 (see FIG. 1), merge join enablement system 106 (see FIG. 1) encrypts the noised values of the keys, where the values of the keys were noised in step 308.

In step 312, merge join enablement system 106 (see FIG. 1) determines that the encryption function 112 (see FIG. 1) is homomorphic to sorting operations.

In step 314, merge join enablement system 106 (see FIG. 1) determines that decryption function 114 (see FIG. 1) is homomorphic to sorting operations. Decryption function 114 (see FIG. 1) decrypts the values of keys that were encrypted in step 310. In one embodiment, the decryption function 114 (see FIG. 1) first applies decryption to undo the encryption performed by the encryption function 112 (see FIG. 1) in step 310 and then applies a de-noising function to undo the noising performed in step 308.

In step 316, based on encryption function 112 (see FIG. 1) and decryption function 114 (see FIG. 1) being homomorphic, merge join enablement system 106 (see FIG. 1) selects merge join operation 116 (see FIG. 1), which operates on data items in first database table 108 (see FIG. 1) and second database table 110 (see FIG. 1). Merge join operation 116 (see FIG. 1) includes decryption function 114 (see FIG. 1) in a joining condition.

In step 318, query optimizer 118 (see FIG. 1) generates an execution plan for query 120 (see FIG. 1), where the execution plan uses merge join operation 116 (see FIG. 1) selected in step 316 to optimize an execution of query 120 (see FIG. 1). Query 120 (see FIG. 1) accesses data item(s) in first database table 108 (see FIG. 1) and/or second database table 110 (see FIG. 1).

After step 318, the process of FIG. 3 ends at step 320.

In one embodiment, the process of FIG. 3 is used when first database table 108 (see FIG. 1) and second database table 110 (see FIG. 1) are in a fact-dimension relation in which the same foreign key is repeated a number of times in the fact table, where the number of times exceeds a threshold number. Noising of the repeated foreign key makes building a correlation difficult and therefore hampers an attacker from reverse engineering the relation.

Figure 4:
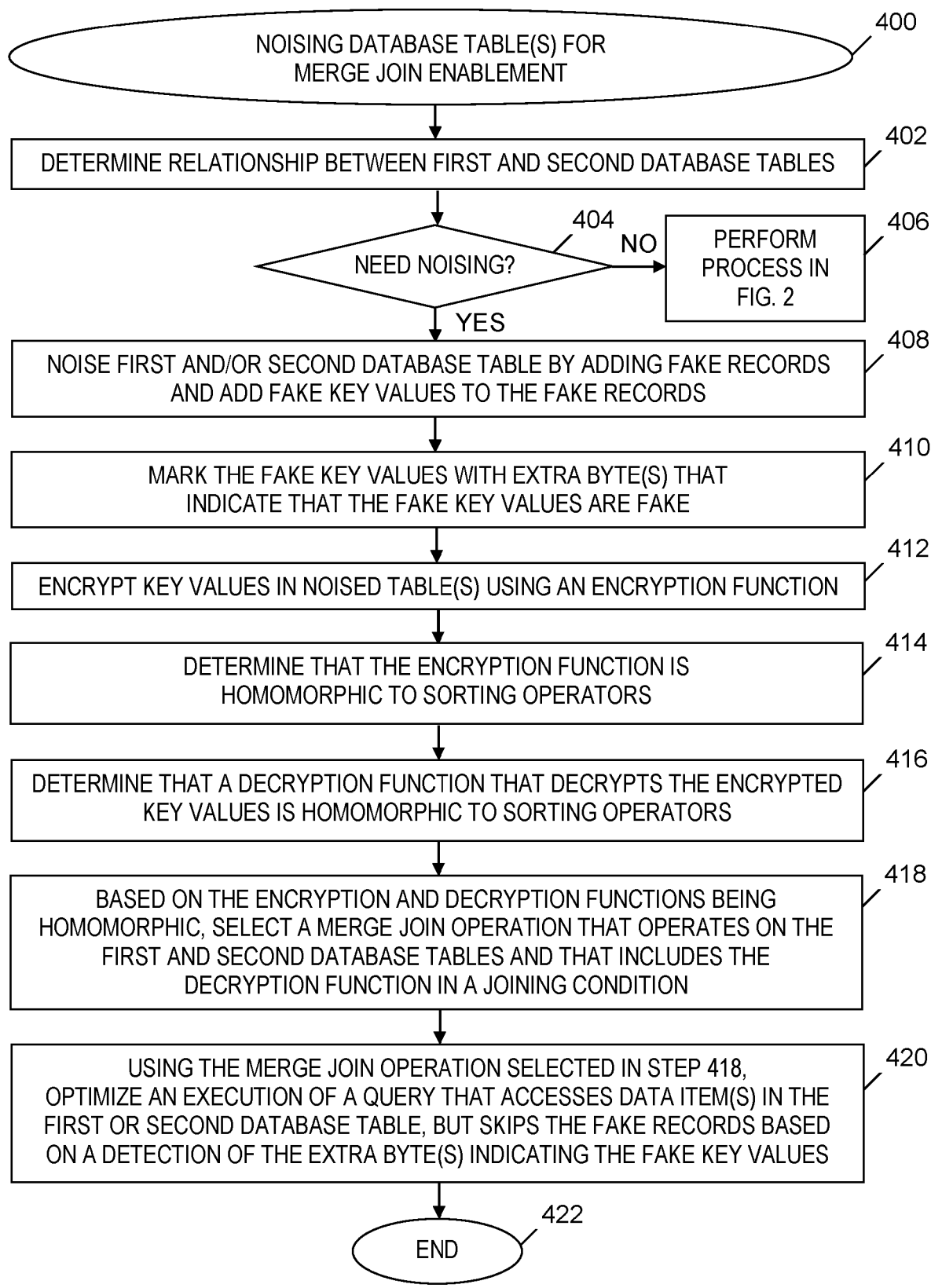
FIG. 4 is a flowchart of a process of noising database table(s) to enhance the process of FIG. 2, in accordance with embodiments of the present invention.

FIG. 4 is a flowchart of a process of noising database table(s) to enhance the process of FIG. 2, in accordance with embodiments of the present invention. The process of FIG. 4 starts at step 400. In step 402, merge join enablement system 106 (see FIG. 1) determines the relationship (e.g., one-to-one, many-to-many, etc.) between first database table 108 (see FIG. 1) and second database table 110 (see FIG. 1), which are accessed by query 120 (see FIG. 1).

In step 404, based on the relationship determined in step 402, merge join enablement system 106 (see FIG. 1) determines whether one or both of the database tables (i.e., first and second database tables 108 and 110 in FIG. 1) need noising. Merge join enablement system 106 (see FIG. 1) determining in step 402 that a one-to-one relationship exists between first database table 108 (see FIG. 1) and second database table 110 (see FIG. 1) is a basis for merge join enablement system 106 (see FIG. 1) determining in step 404 that there is a need for noising first database table 108 (see FIG. 1) and/or second database table 110 (see FIG. 1). If merge join enablement system 106 (see FIG. 1) instead determines that there is not a one-to-one relationship between first database table 108 (see FIG. 1) and second database table 110 (see FIG. 1) (e.g., there is a many-to-many relationship between the database tables), then merge join enablement system 106 (see FIG. 1) determines in step 404 that there is not a need for noising first database table 108 (see FIG. 1) and/or second database table 110 (see FIG. 1). In other embodiments, determining whether noising is required or not in step 404 is based on factors other than whether a one-to-one relationship or a many-to-many relationship exists between the database tables.

If merge join enablement system 106 (see FIG. 1) determines in step 404 that neither the first or second database tables 108 and 110 (see FIG. 1) needs noising, then the No branch of step 404 is followed and step 406 is performed. In step 406, the process of FIG. 2 as discussed above is performed.

Returning to step 404, if merge join enablement system 106 (see FIG. 1) determines that first database table 108 (see FIG. 1) and/or second database table 110 (see FIG. 1) needs noising, then the Yes branch is followed and step 408 is performed.

In step 408, merge join enablement system 106 (see FIG. 1) noises first database table 108 (see FIG. 1) and/or second database table 110 (see FIG. 1) by adding fake records (i.e., additional duplicate records) to first database table 108 (see FIG. 1) and/or second database table 110 (see FIG. 1) and adding fake values of keys to the fake records. For example, the fake value of a key in a particular record can be a random value or a value taken from another record. The random value can be provided by a pseudo-random number generator or a hardware random number generator.

In step 410, merge join enablement system 106 (see FIG. 1) marks the fake values of the keys with extra byte(s) that indicate that the values of the keys are fake (e.g., by adding extra 0xFFFF bytes at the beginning of each value).

In one embodiment, noising system 122 (see FIG. 1) performs steps 402, 404, 408, and 410.

In step 412, using encryption function 112 (see FIG. 1), merge join enablement system 106 (see FIG. 1) encrypts the values of the keys in first database table 108 (see FIG. 1) and/or second database table 110 (see FIG. 1) that was noised in step 408.

In step 414, merge join enablement system 106 (see FIG. 1) determines that the encryption function 112 (see FIG. 1) is homomorphic to sorting operations.

In step 416, merge join enablement system 106 (see FIG. 1) determines that decryption function 114 (see FIG. 1) is homomorphic to sorting operations. Decryption function 114 (see FIG. 1) decrypts the values of keys that were encrypted in step 412. In one embodiment, the decryption function 114 (see FIG. 1) first applies decryption to undo the encryption performed by the encryption function 112 (see FIG. 1) in step 412 and then applies a de-noising function to undo the noising performed in step 408.

In step 418, based on encryption function 112 (see FIG. 1) and decryption function 114 (see FIG. 1) being homomorphic, merge join enablement system 106 (see FIG. 1) selects merge join operation 116 (see FIG. 1), which operates on data items in first database table 108 (see FIG. 1) and second database table 110 (see FIG. 1). Merge join operation 116 (see FIG. 1) includes decryption function 114 (see FIG. 1) in a joining condition.

In step 420, query optimizer 118 (see FIG. 1) generates an execution plan for query 120 (see FIG. 1), where the execution plan uses merge join operation 116 (see FIG. 1) selected in step 418 (see FIG. 1) to optimize an execution of query 120 (see FIG. 1). Query 120 (see FIG. 1) accesses data item(s) in first database table 108 (see FIG. 1) and/or second database table 110 (see FIG. 1).

After step 420, the process of FIG. 4 ends at step 422.

In one embodiment, because the values of the keys are encrypted, an unauthorized party cannot discover which records are fake and which records are genuine. During the retrieval or joining process, the data items that are in the fake records can be skipped based on a detection of the extra byte(s) that indicate the fake values of the keys.

In an alternate embodiment that selects the process of FIG. 3 or the process of FIG. 4 depending on data type, noising system 122 (see FIG. 1) determines the data type of the key columns in first database table 108 (see FIG. 1) and second database table 110 (see FIG. 1). If the data type is a small data type (e.g., <8 bytes) and merge join enablement system 106 (see FIG. 1) determines that noising is needed because of a detection of a one-to-one relationship between the database tables, then noising system 122 (see FIG. 1) selects and performs the noising process in FIG. 4. If the data type is not a small data type and noising is needed, then noising system 122 (see FIG. 1) selects and performs the noising process in FIG. 3.

EXAMPLES

Figure 5A:
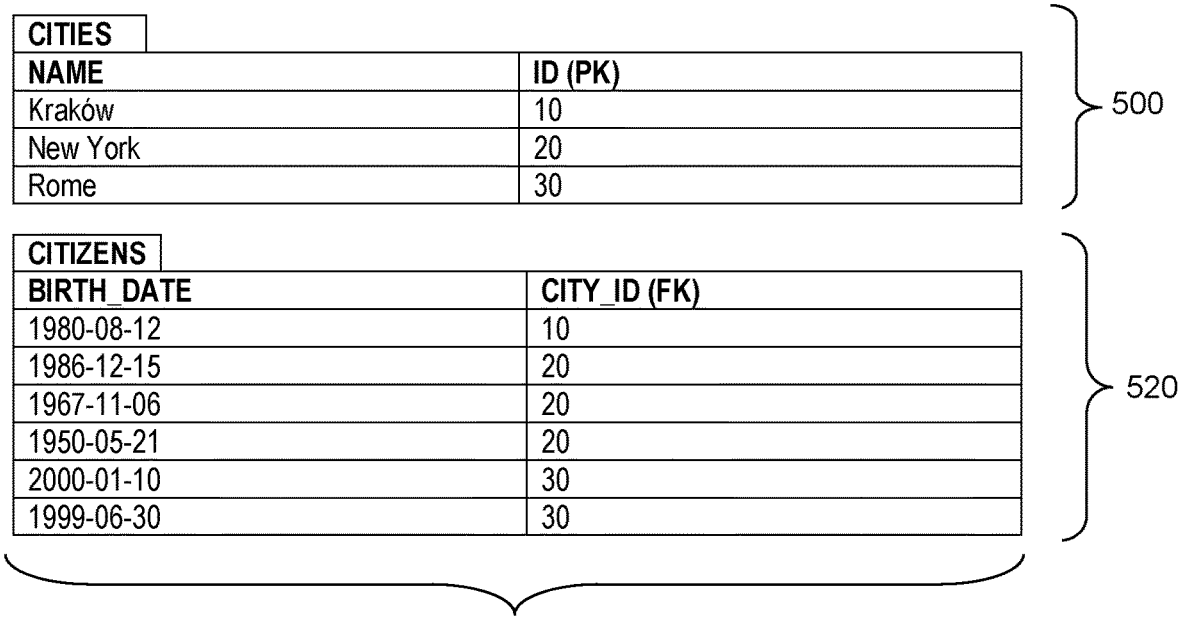
FIG. 5A depicts examples of database tables used in the process of FIG. 2, in accordance with embodiments of the present invention.
Figure 5B:
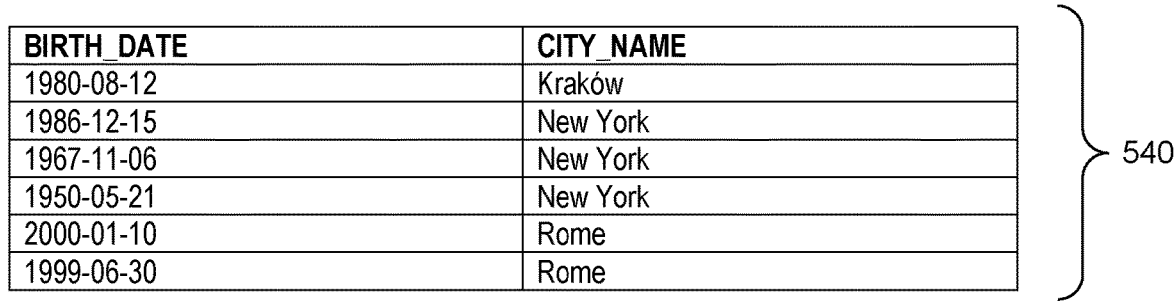
FIG. 5B is an example of a database table resulting from a merge join operation selected in the process of FIG. 2 and applied to the database tables in FIG. 5A, in accordance with embodiments of the present invention.

FIG. 5A depicts examples of database tables 500 and 520 used in the process of FIG. 2, in accordance with embodiments of the present invention. Database table 500 in FIG. 5A is a cities table that includes a name column for the names of cities and an identifier (ID) column, which is a primary key. Database table 520 in FIG. 5A is a citizens table that includes a birth_date column for the birth dates of citizens and a city_ID column, which is a foreign key. Query 120 (see FIG. 1) accesses tables 500 and 520 with the following SELECT statement:

SELECT birth_date, name as city_name FROM cities INNER JOIN citizens on id=city_id Applying merge join operation 116 (see FIG. 1) returns the rows in database table 540 in FIG. 5B. Database table 540 includes a birth_date column and a city_name column.

FIG. 5B is an example of a database table 540 resulting from a merge join operation selected in the process of FIG. 2 and applied to the database tables 500 and 520 in FIG. 5A, in accordance with embodiments of the present invention.

FIG. 5C is an example of database table 560 resulting from encrypting values of keys in the citizens database table 520 in FIG. 5A, in accordance with embodiments of the present invention. Merge join enablement system 106 (see FIG. 1) performs step 202 (see FIG. 2) to encode the city_id column in database table 520 (see FIG. 5A) using the following naïve homomorphic encryption function (i.e., encryption function 112 (see FIG. 1)):

$$e(x, \text{key}) = x + \text{key},$$

where key is 7 in this example.

After encoding with the naïve homomorphic encryption function 112 (see FIG. 1), merge join enablement system 106 (see FIG. 1) stores the encoded values in the city_id column in database table 560, where the encoded values are ordered by city_id.

In this example, the decryption function 114 (see FIG. 1) is $d(x, \text{key}) = x - \text{key}$. If merge join enablement system 106 (see FIG. 1) is aware from step 206 (see FIG. 2) that the decryption function d(x) is homomorphic, then the following statement can be executed as merge join operation 116 (see FIG. 1):

SELECT birth_date, name as city_name FROM cities INNER JOIN citizens_d on d(city_id)=id.

FIG. 5D is an example of a citizens database table 580 resulting from citizens database table 520 in FIG. 5A being noised and encoded in the process of FIG. 3, in accordance with embodiments of the present invention. In step 302 (see FIG. 3), merge join enablement system 106 (see FIG. 1) determines the relation between city and citizens database tables 500 and 520 in FIG. 5A. If the relation is determined in step 302 (see FIG. 3) to be 0 . . . 1⇔0 . . . 1, then merge join enablement system 106 (see FIG. 1) can perform the process of FIG. 2 to obtain database table 560 in FIG. 5C. If the relation, however, is determined in step 302 (see FIG. 3) to be 1⇔1, then an extra precaution is required to hinder a relation rebuild without a key by an unauthorized party. The extra precaution is provided by merge join enablement system 106 (see FIG. 1) adding noise to values of keys using the following noise function:

$$n(x) = x*64 + \text{rand}(64),$$

where rand(64) is a random value between 0 and 63 generated by a pseudo-random number generator or a hardware random number generator.

Given the noise function presented above, encryption function 112 (see FIG. 1) is:

$$e1(x, \text{key}) = e(n(x), \text{key})$$

Examples of the noised and encoded foreign key values are included in the city_id column in citizens database table 580 in FIG. 5D.

Given the noise function and the encryption function presented in the example relative to FIG. 5D, the decryption function 114 (see FIG. 1) is:

$$d1(x,\text{key}) = dn(d(x,\text{key})),$$

where d(x) is the decryption function discussed above relative to FIG. 5C and dn(x) is the following de-noising function:

$$dn(x) = x/64$$

Computer System

Figure 6:
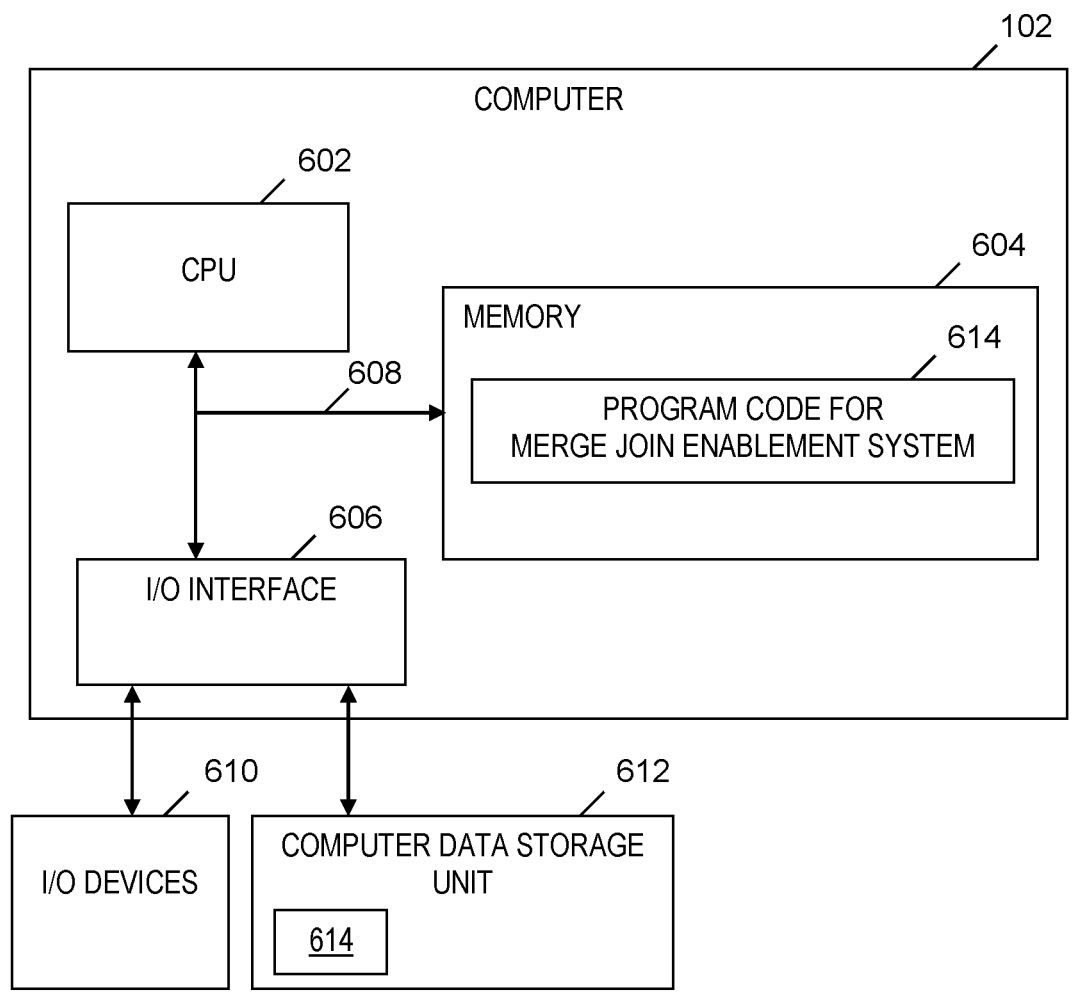
FIG. 6 is a block diagram of a computer included in the system of FIG. 1 and that implements the processes of FIG. 2, FIG. 3, and FIG. 4 in accordance with embodiments of the present invention.

FIG. 6 is a block diagram of a computer included in the system of FIG. 1 and that implements the process of FIG. 2, FIG. 3, and FIG. 4, in accordance with embodiments of the present invention. Computer 102 is a computer system that generally includes a central processing unit (CPU) 602, a memory 604, an input/output (I/O) interface 606, and a bus 608. Further, computer 102 is coupled to I/O devices 610 and a computer data storage unit 612. CPU 602 performs computation and control functions of computer 102, including executing instructions included in program code 614 for merge join enablement system 106 (see FIG. 1) to perform a method of encrypting data for merge join enablement, where the instructions are executed by CPU 602 via memory 604. CPU 602 may include a single processing unit or be distributed across one or more processing units in one or more locations (e.g., on a client and server).

Memory 604 includes a known computer readable storage medium, which is described below. In one embodiment, cache memory elements of memory 604 provide temporary storage of at least some program code (e.g., program code 614) in order to reduce the number of times code must be retrieved from bulk storage while instructions of the program code are executed. Moreover, similar to CPU 602, memory 604 may reside at a single physical location, including one or more types of data storage, or be distributed across a plurality of physical systems in various forms. Further, memory 604 can include data distributed across, for example, a local area network (LAN) or a wide area network (WAN).

I/O interface 606 includes any system for exchanging information to or from an external source. I/O devices 610 include any known type of external device, including a display, keyboard, etc. Bus 608 provides a communication link between each of the components in computer 102, and may include any type of transmission link, including electrical, optical, wireless, etc.

I/O interface 606 also allows computer 102 to store information (e.g., data or program instructions such as program code 614) on and retrieve the information from computer data storage unit 612 or another computer data storage unit (not shown). Computer data storage unit 612 includes a known computer readable storage medium, which is described below. In one embodiment, computer data storage unit 612 is a non-volatile data storage device, such as a magnetic disk drive (i.e., hard disk drive) or an optical disc drive (e.g., a CD-ROM drive which receives a CD-ROM disk).

Memory 604 and/or storage unit 612 may store computer program code 614 that includes instructions that are executed by CPU 602 via memory 604 to encrypt data for merge join enablement. Although FIG. 6 depicts memory 604 as including program code, the present invention contemplates embodiments in which memory 604 does not include all of code 614 simultaneously, but instead at one time includes only a portion of code 614.

Further, memory 604 may include an operating system (not shown) and may include other systems not shown in FIG. 6.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to encrypting data for merge join enablement. Thus, an embodiment of the present invention discloses a process for supporting computer infrastructure, where the process includes providing at least one support service for at least one of integrating, hosting, maintaining and deploying computer-readable code (e.g., program code 614) in a computer system (e.g., computer 102) including one or more processors (e.g., CPU 602), wherein the processor(s) carry out instructions contained in the code causing the computer system to encrypt data for merge join enablement. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of encrypting data for merge join enablement.

While it is understood that program code 614 for encrypting data for merge join enablement may be deployed by manually loading directly in client, server and proxy computers (not shown) via loading a computer readable storage medium (e.g., computer data storage unit 612), program code 614 may also be automatically or semi-automatically deployed into computer 102 by sending program code 614 to a central server or a group of central servers. Program code 614 is then downloaded into client computers (e.g., computer 102) that will execute program code 614. Alternatively, program code 614 is sent directly to the client computer via e-mail. Program code 614 is then either detached to a directory on the client computer or loaded into a directory on the client computer by a button on the e-mail that executes a program that detaches program code 614 into a directory. Another alternative is to send program code 614 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 614 is transmitted to the proxy server and then it is stored on the proxy server.

Another embodiment of the invention provides a method that performs the process steps on a subscription, advertising and/or fee basis. That is, a service provider can offer to create, maintain, support, etc. a process of encrypting data for merge join enablement. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 604 and computer data storage unit 612) having computer readable program instructions 614 thereon for causing a processor (e.g., CPU 602) to carry out aspects of the present invention.

The computer readable storage medium can be a tangible device that can retain and store instructions (e.g., program code 614) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 614) described herein can be downloaded to respective computing/processing devices (e.g., computer 102) from a computer readable storage medium or to an external computer or external storage device (e.g., computer data storage unit 612) via a network (not shown), for example, the Internet, a local area network, a wide area network and/or a wireless network. The network may comprise copper transmission cables, optical transmission fibers, wireless transmission, switches, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 614) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2, FIG. 3, and FIG. 4) and/or block diagrams (e.g., FIG. 1 and FIG. 6) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 614).

These computer readable program instructions may be provided to a processor (e.g., CPU 602) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 612) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 614) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of encrypting data, the method comprising:
    ordering, by one or more processors, (i) first data in original records in a first database table by a foreign key included in the first database table and (ii) second data in a second database table by a primary key included in the second database table, the first and second database tables being included in a relational database management system;
    adding, by the one or more processors, fake records to the first database table, the fake records including fake values of the foreign key;
    encrypting, by the one or more processors and using an encryption function, values of the foreign key in the original records included in the first database table;
    encrypting, by the one or more processors and using the encryption function, the fake values of the foreign key in the fake records;
    determining, by the one or more processors, that the encryption function is homomorphic to sorting operators;
    determining, by the one or more processors, that a decryption function that decrypts the encrypted values of the foreign key in the original records included in the first database table and the encrypted fake values of the foreign key in the fake records is homomorphic to sorting operators;
    in response to the encryption and decryption functions being determined to be homomorphic, selecting, by the one or more processors, a merge join operation that operates on the first and second database tables and that includes the decryption function in a joining condition;
    using the selected merge join operation, optimizing, by the one or more processors, an execution of a query that accesses one or more data items in the first database table, wherein the optimizing the execution of the query includes determining that the fake values of the foreign key in the fake records are fake, and in response to the determining that the fake values of the foreign key in the fake records are fake, skipping over the fake records in an access of the one or more data items in the first database table; and
    modifying, by the one or more processors, data items in the first database table by noising the data items, wherein the encrypting the values of the foreign key in the original records and the encrypting the fake values of the foreign key include applying a homomorphic function to the noised data items, and wherein the noising includes the adding the fake records to the first database table.

2. The method of claim 1, further comprising determining, by the one or more processors, that the first database table and the second database table are related in a one-to-one correspondence, wherein the noising the data items is performed in response to the first and second data tables being determined to be related in the one-to-one correspondence, wherein the noising further includes (i) adding the fake values of the foreign key in the fake records as random values being provided by a pseudo-random number generator or a hardware random number generator and (ii) marking the random values added as the fake values of the foreign key in the fake records with one or more extra bytes that indicate that the fake values of the foreign key in the fake records are fake, wherein the determining that the fake values of the foreign key in the fake records are fake includes detecting the one or more extra bytes that indicate that the fake values of the foreign key in the fake records are fake, and wherein the skipping over the fake records in the access of the one or more data items in the first database table is performed in response to the detecting the one or more extra bytes that indicate that the fake values of the foreign key are fake.

3. The method of claim 1, further comprising:
    determining, by the one or more processors, that a third database table and a fourth database table are related in a one-to-one correspondence, the third and fourth database tables being included in a second relational database management system;
    in response to the third and fourth database tables being determined to be related in the one-to-one correspondence, noising, by the one or more processors, data items in the third database table by adding, by the one or more processors, respective extensions to values of a second foreign key in the third database table, each extension including one or more bytes of data provided by a pseudo-random number generator or a hardware random number generator;
    subsequent to the noising, encrypting, by the one or more processors and using a second encryption function, the values of the second foreign key to which the extensions are added;
    determining, by the one or more processors, that the second encryption function is homomorphic to sorting operators;
    determining, by the one or more processors, that a second decryption function that decrypts the encrypted values of the second foreign key in the third database table is homomorphic to sorting operators;
    in response to the second encryption and second decryption functions being determined to be homomorphic, selecting, by the one or more processors, a second merge join operation that operates on the third and fourth database tables and that includes the second decryption function in a second joining condition; and
    executing, by the one or more processors, a second query that accesses one or more data items in the third database table, wherein the executing includes (i) applying the second decryption function to the encrypted values of the second foreign key to which the extensions are added to obtain decrypted values of the second foreign key in the third database table and (ii) de-noising the decrypted values of the second foreign key in the third database table.

4. The method of claim 1, further comprising:
    determining, by the one or more processors, a data type of the values of the foreign key in the original records included in the first database table; and
    determining, by the one or more processors, that the data type is a small data type that indicates that each of the values of the keys in the original records is less than eight bytes in length, wherein the adding the fake records is performed in response to the determining that the data type of the values of the keys is the small data type.

5. The method of claim 1, further comprising the one or more processors executing the query by decrypting the encrypted values of the foreign key in the original records and the encrypted fake values of the foreign key in the fake records and applying the merge join operation on the decrypted values of the foreign key in the original records and the decrypted fake values of the foreign key in the fake records.

6. The method of claim 1, further comprising:
providing at least one support service for at least one of creating, integrating, hosting, maintaining, and deploying computer readable program code in the computer, the program code being executed by a processor of the computer to implement the ordering first data by the foreign key and second data by the primary key, the adding the fake records, the encrypting the values of the foreign key in the original records, the encrypting the fake values of the foreign key in the fake records, the determining that the encryption function is homomorphic to sorting operators, the determining that the decryption function is homomorphic to sorting operators, the selecting the merge join operation, the optimizing the execution of the query, and the modifying the data items in the first database table by noising the data items.

7. The method of claim 1, further comprising:
ordering, by the one or more processors, (i) third data in original records in a third database table by a second primary key included in the third database table and (ii) fourth data in a fourth database table by a second foreign key included in the fourth database table, the third and fourth database tables being included in the relational database management system;
adding, by the one or more processors, second fake records to the third database table, the second fake records including second fake values of the second primary key;
encrypting, by the one or more processors and using a second encryption function, values of the second primary key in the original records included in the third database table;
encrypting, by the one or more processors and using the second encryption function, the second fake values of the second primary key in the second fake records;
determining, by the one or more processors, that the second encryption function is homomorphic to sorting operators;
determining, by the one or more processors, that a second decryption function that decrypts the encrypted values of the second primary key in the original records included in the third database table and the encrypted second fake values of the second primary key in the second fake records is homomorphic to sorting operators;
in response to the second encryption and second decryption functions being determined to be homomorphic, selecting, by the one or more processors, a second merge join operation that operates on the third and fourth database tables and that includes the second decryption function in a second joining condition; and
using the selected second merge join operation, optimizing, by the one or more processors, an execution of a second query that accesses one or more data items in the third database table, wherein the optimizing the execution of the second query includes determining that the second fake values of the second primary key in the second fake records are fake, and in response to the determining that the second fake values of the second primary key in the second fake records are fake, skipping over the second fake records in an access of the one or more data items in the third database table.

8. A computer program product for encrypting data, the computer program product comprising:
a computer readable storage medium having computer readable program code stored on the computer readable storage medium, wherein the computer readable storage medium is not a transitory signal per se, the computer readable program code being executed by a central processing unit (CPU) of a computer system to cause the computer system to perform a method comprising:
the computer system ordering (i) first data in original records in a first database table by a foreign key included in the first database table and (ii) second data in a second database table by a primary key included in the second database table, the first and second database tables being included in a relational database management system;
the computer system adding fake records to the first database table, the fake records including fake values of the foreign key;
using an encryption function, the computer system encrypting values of the foreign key in the original records included in the first database table;
using the encryption function, the computer system encrypting the fake values of the foreign key in the fake records;
the computer system determining that the encryption function is homomorphic to sorting operators;
the computer system determining that a decryption function that decrypts the encrypted values of the foreign key in the original records included in the first database table and the encrypted fake values of the foreign key in the fake records is homomorphic to sorting operators;
in response to the encryption and decryption functions being determined to be homomorphic, the computer system selecting a merge join operation that operates on the first and second database tables and that includes the decryption function in a joining condition;
using the selected merge join operation, the computer system optimizing an execution of a query that accesses one or more data items in the first database table, wherein the optimizing the execution of the query includes determining that the fake values of the foreign key in the fake records are fake, and in response to the determining that the fake values of the foreign key in the fake records are fake, skipping over the fake records in an access of the one or more data items in the first database table; and
the computer system modifying data items in the first database table by noising the data items, wherein the encrypting the values of the foreign key in the original records and the encrypting the fake values of the foreign key include applying a homomorphic function to the noised data items, and wherein the noising includes the adding the fake records to the first database table.

9. The computer program product of claim 8, wherein the method further comprises the computer system determining that the first database table and the second database table are related in a one-to-one correspondence, wherein the noising the data items is performed in response to the first and second data tables being determined to be related in the one-to-one correspondence, wherein the noising further includes (i) adding the fake values of the foreign key in the fake records as random values being provided by a pseudo-random number generator or a hardware random number generator and (ii) marking the random values added as the fake values of the foreign key in the fake records with one or more extra bytes that indicate that the fake values of the foreign key in the fake records are fake, wherein the determining that the fake values of the keys in the fake records are fake includes detecting the one or more extra bytes that indicate that the fake values of the foreign key in the fake records are fake, and wherein the skipping over the fake records in the access of the one or more data items in the first database table is performed in response to the detecting the one or more extra bytes that indicate that the fake values of the foreign key are fake.

10. The computer program product of claim 8, wherein the method further comprises:
the computer system determining that a third database table and a fourth database table are related in a one-to-one correspondence, the third and fourth database tables being included in a second relational database management system;
in response to the third and fourth database tables being determined to be related in the one-to-one correspondence, the computer system noising data items in the third database table by the computer system adding respective extensions to values of a second foreign key in the third database table, each extension including one or more bytes of data provided by a pseudo-random number generator or a hardware random number generator;
subsequent to the noising and using a second encryption function, the computer system encrypting the values of the second foreign key to which the extensions are added;
the computer system determining that the second encryption function is homomorphic to sorting operators;
the computer system determining that a second decryption function that decrypts the encrypted values of the second foreign key in the third database table is homomorphic to sorting operators;
in response to the second encryption and second decryption functions being determined to be homomorphic, the computer system selecting a second merge join operation that operates on the third and fourth database tables and that includes the second decryption function in a second joining condition; and
the computer system executing a second query that accesses one or more data items in the third database table, wherein the executing includes (i) applying the second decryption function to the encrypted values of the second foreign key to which the extensions are added to obtain decrypted values of the second foreign key in the third database table and (ii) de-noising the decrypted values of the second foreign key in the third database table.

11. The computer program product of claim 8, further comprising the computer system executing the query by decrypting the encrypted values of the foreign key in the original records and the encrypted fake values of the foreign key in the fake records and applying the merge join operation on the decrypted values of the foreign key in the original records and the decrypted fake values of the foreign key in the fake records.

12. The computer program product of claim 8, wherein the method further comprises:
the computer system ordering (i) third data in original records in a third database table by a second primary key included in the third database table and (ii) fourth data in a fourth database table by a second foreign key included in the fourth database table, the third and fourth database tables being included in the relational database management system;
the computer system adding second fake records to the third database table, the second fake records including second fake values of the second primary key;
using a second encryption function, the computer system encrypting values of the second primary key in the original records included in the third database table;
using the second encryption function, the computer system encrypting the second fake values of the second primary key in the second fake records;
the computer system determining that the second encryption function is homomorphic to sorting operators;
the computer system determining that a second decryption function that decrypts the encrypted values of the second primary key in the original records included in the third database table and the encrypted second fake values of the second primary key in the second fake records is homomorphic to sorting operators;
in response to the second encryption and second decryption functions being determined to be homomorphic, the computer system selecting a second merge join operation that operates on the third and fourth database tables and that includes the second decryption function in a second joining condition; and
using the selected second merge join operation, the computer system optimizing an execution of a second query that accesses one or more data items in the third database table, wherein the optimizing the execution of the second query includes determining that the second fake values of the second primary key in the second fake records are fake, and in response to the determining that the second fake values of the second primary key in the second fake records are fake, skipping over the second fake records in an access of the one or more data items in the third database table.

13. A computer system comprising:
a central processing unit (CPU);
a memory coupled to the CPU; and
a computer readable storage medium coupled to the CPU, the computer readable storage medium containing instructions that are executed by the CPU via the memory to implement a method of encrypting data, the method comprising:
the computer system ordering (i) first data in original records in a first database table by a foreign key included in the first database table and (ii) second data in a second database table by a primary key included in the second database table, the first and second database tables being included in a relational database management system;
the computer system adding fake records to the first database table, the fake records including fake values of the foreign key;
using an encryption function, the computer system encrypting values of the foreign key in the original records included in the first database table;

using the encryption function, the computer system encrypting the fake values of the foreign key in the fake records;

the computer system determining that the encryption function is homomorphic to sorting operators;

the computer system determining that a decryption function that decrypts the encrypted values of the foreign key in the original records included in the first database table and the encrypted fake values of the foreign key in the fake records is homomorphic to sorting operators;

in response to the encryption and decryption functions being determined to be homomorphic, the computer system selecting a merge join operation that operates on the first and second database tables and that includes the decryption function in a joining condition;

using the selected merge join operation, the computer system optimizing an execution of a query that accesses one or more data items in the first database table, wherein the optimizing the execution of the query includes determining that the fake values of the foreign key in the fake records are fake, and in response to the determining that the fake values of the foreign key in the fake records are fake, skipping over the fake records in an access of the one or more data items in the first database table; and the computer system modifying data items in the first database table by noising the data items, wherein the encrypting the values of the foreign key in the original records and the encrypting the fake values of the foreign key include applying a homomorphic function to the noised data items, and wherein the noising includes the adding the fake records to the first database table.

14. The computer system of claim 13, wherein the method further comprises the computer system determining that the first database table and the second database table are related in a one-to-one correspondence, wherein the noising the data items is performed in response to the first and second data tables being determined to be related in the one-to-one correspondence, wherein the noising further includes (i) adding the fake values of the foreign key in the fake records as random values being provided by a pseudo-random number generator or a hardware random number generator and (ii) marking the random values added as the fake values of the foreign key in the fake records with one or more extra bytes that indicate that the fake values of the foreign key in the fake records are fake, wherein the determining that the fake values of the foreign key in the fake records are fake includes detecting the one or more extra bytes that indicate that the fake values of the foreign key in the fake records are fake, and wherein the skipping over the fake records in the access of the one or more data items in the first database table is performed in response to the detecting the one or more extra bytes that indicate that the fake values of the foreign key are fake.

15. The computer system of claim 13, wherein the method further comprises the steps of:

the computer system determining that a third database table and a fourth database table are related in a one-to-one correspondence, the third and fourth database tables being included in a second relational database management system;

in response to the third and fourth database tables being determined to be related in the one-to-one correspondence, the computer system noising data items in the third database table by the computer system adding respective extensions to values of a second foreign key in the third database table, each extension including one or more bytes of data provided by a pseudo-random number generator or a hardware random number generator;

subsequent to the noising and using a second encryption function, the computer system encrypting the values of the second foreign key to which the extensions are added;

the computer system determining that the second encryption function is homomorphic to sorting operators;

the computer system determining that a second decryption function that decrypts the encrypted values of the second foreign key in the third database table is homomorphic to sorting operators;

in response to the second encryption and second decryption functions being determined to be homomorphic, the computer system selecting a second merge join operation that operates on the third and fourth database tables and that includes the second decryption function in a second joining condition; and the computer system executing a second query that accesses one or more data items in the third database table, wherein the executing includes (i) applying the second decryption function to the encrypted values of the second foreign key to which the extensions are added to obtain decrypted values of the second foreign key in the third database table and (ii) de-noising the decrypted values of the second foreign key in the third database table.

16. The computer system of claim 13, wherein the method further comprises:

the computer system ordering (i) third data in original records in a third database table by a second primary key included in the third database table and (ii) fourth data in a fourth database table by a second foreign key included in the fourth database table, the third and fourth database tables being included in the relational database management system;

the computer system adding second fake records to the third database table, the second fake records including second fake values of the second primary key;

using a second encryption function, the computer system encrypting values of the second primary key in the original records included in the third database table;

using the second encryption function, the computer system encrypting the second fake values of the second primary key in the second fake records;

the computer system determining that the second encryption function is homomorphic to sorting operators;

the computer system determining that a second decryption function that decrypts the encrypted values of the second primary key in the original records included in the third database table and the encrypted second fake values of the second primary key in the second fake records is homomorphic to sorting operators;

in response to the second encryption and second decryption functions being determined to be homomorphic, the computer system selecting a second merge join operation that operates on the third and fourth database tables and that includes the second decryption function in a second joining condition; and using the selected second merge join operation, the computer system optimizing an execution of a second query that accesses one or more data items in the third database table, wherein the optimizing the execution of the second query includes determining that the second fake values of the second primary key in the second fake records are fake, and in response to the determining that the second fake values of the second primary key in the second fake records are fake, skipping over the second fake records in an access of the one or more data items in the third database table.

\* \* \* \* \*